United States Patent [19]
Beil

[11] 3,938,376
[45] Feb. 17, 1976

[54] VOLUME SIGNAL GENERATOR FOR THERMODYNAMIC CYCLE ANALYZERS

[75] Inventor: Richard C. Beil, Peoria, Ill.

[73] Assignee: Caterpillar Tractor Co., Peoria, Ill.

[22] Filed: Nov. 4, 1974

[21] Appl. No.: 520,242

[52] U.S. Cl. .................................. 73/115; 73/117.3
[51] Int. Cl.² ........................................ G01M 15/00
[58] Field of Search ............ 73/115, 117.3, DIG. 11; 250/231 R, 231 SE, 231 P

[56] References Cited
UNITED STATES PATENTS

| | | | |
|---|---|---|---|
| 2,314,287 | 3/1943 | Pope | 73/469 |
| 3,358,150 | 12/1967 | Summer | 250/231 R |
| 3,815,410 | 6/1974 | Brown, Jr. et al. | 73/115 |

*Primary Examiner*—Jerry W. Myracle
*Attorney, Agent, or Firm*—Phillips, Moore, Weissenberger Lempio & Strabala

[57] ABSTRACT

An improved volume signal generator for use with a thermodynamic cycle analyzer for determining the mean effective pressure of an internal combustion engine, includes an axially rotatable cylindrical cam having a hollow truncated end providing an axially gyrating cam surface about the periphery thereof. A light source located within the hollow truncated end directs a radially disposed beam of light towards a photo diode so as to be cyclically interrupted by the cam surface during operation. The same light source cooperates with openings in the cylindrical wall of the cam and with a second photo diode to produce timing signals representative of the extreme positions of the engine's piston.

1 Claim, 5 Drawing Figures

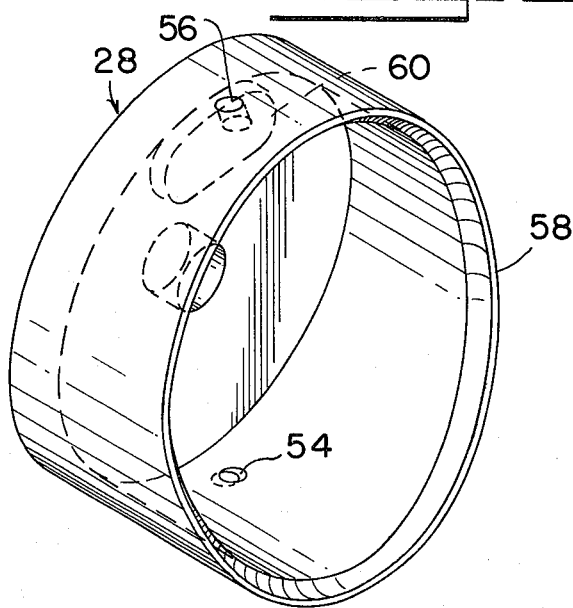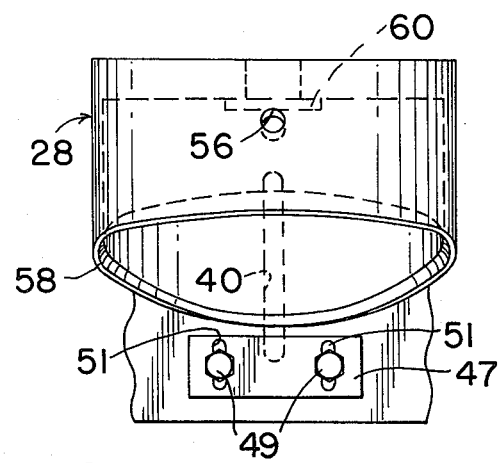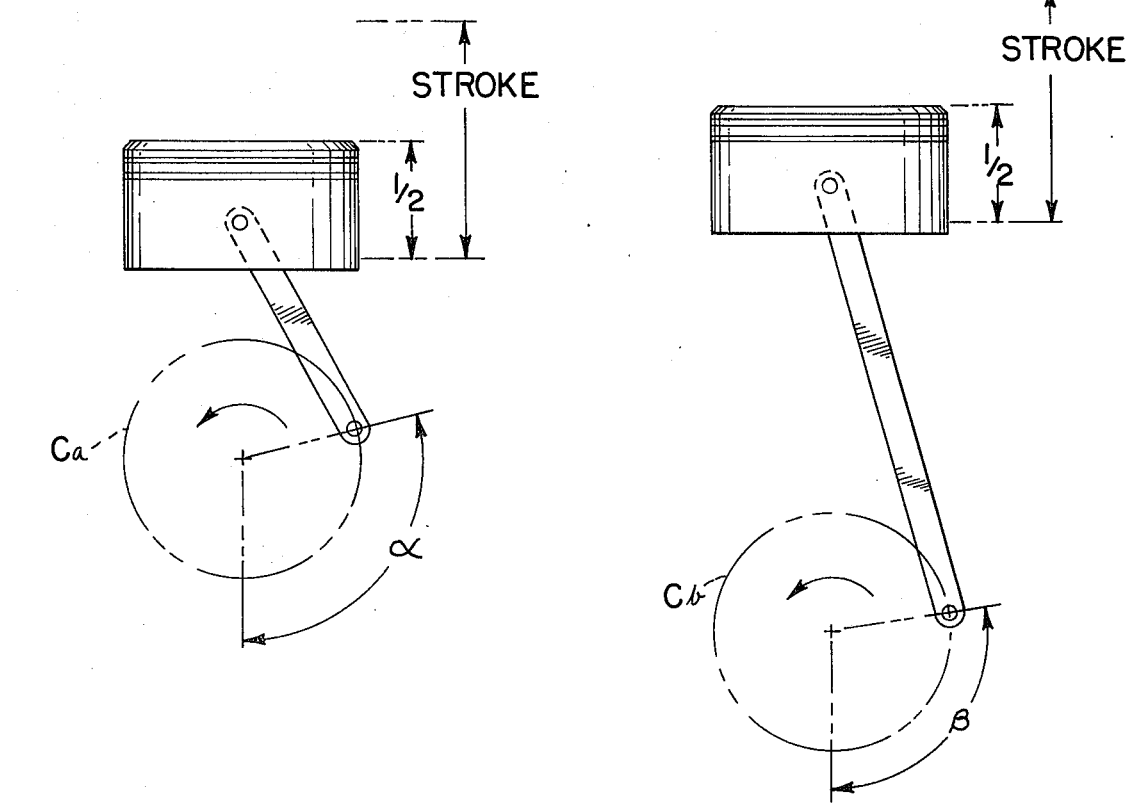

VOLUME SIGNAL GENERATOR FOR THERMODYNAMIC CYCLE ANALYZERS

BACKGROUND OF THE INVENTION

U.S. Pat. No. 3,815,410 describes a thermodynamic cycle analyzer for internal combustion engines, using a volume signal generator attached to the crankshaft of the engine. The analyzer of U.S. Pat. No. 3,815,410 produces the volume signal by rotating an eccentric disc between a radially positioned elongated light source (i.e., evenly illuminated slot) and a photocell. The length of the light source seen by the photocell is thus made a function of the angular position of the eccentric disc, which in turn is a function of the piston position and therefore the volume of the combustion chamber.

The problems with the arrangement of U.S. Pat. No. 3,815,410 is that when the device is used on fastrunning engines, the eccentric weight distribution of the disc sets up vibrations which impair the accuracy of the photoelectric arrangement beyond permissible limits.

SUMMARY OF THE INVENTION

The present invention overcomes this difficulty by substituting for the eccentric disc an axially rotatable cylindrical cam, comprising a cylinder having a hollow truncated end with a predetermined curved cam surface formed thereon. Counterweight means are provided in the cylinder to dynamically balance the cylinder against vibration at high speeds.

In addition to the elimination of vibration problems, the hollow truncated cylinder arrangement of this invention permits the use of a single light source to produce both the volume signal and the timing signals representing the top and bottom of the piston stroke.

The truncated cylinder arrangement also permits the generator housing to be made shorter and lighter than was possible with the arrangement of U.S. Pat. No. 3,815,410. This feature, combined with the separate support for the signal generator assembly, greatly reduces the stress imposed on the driveshaft of the signal generator by the signal generating device.

BRIEF DESCRIPTION OF THE DRAWINGS

FIG. 2 is a perspective view of the cylindrical cam.

FIG. 3 is a plan view of the cam and slot; and

FIGS. 4A and 4B are schematic views illustrating the relationship of the cam shape to the stroke-to-rod-length ratio of the engine.

DESCRIPTION OF THE PREFERRED EMBODIMENT

Figure 1:
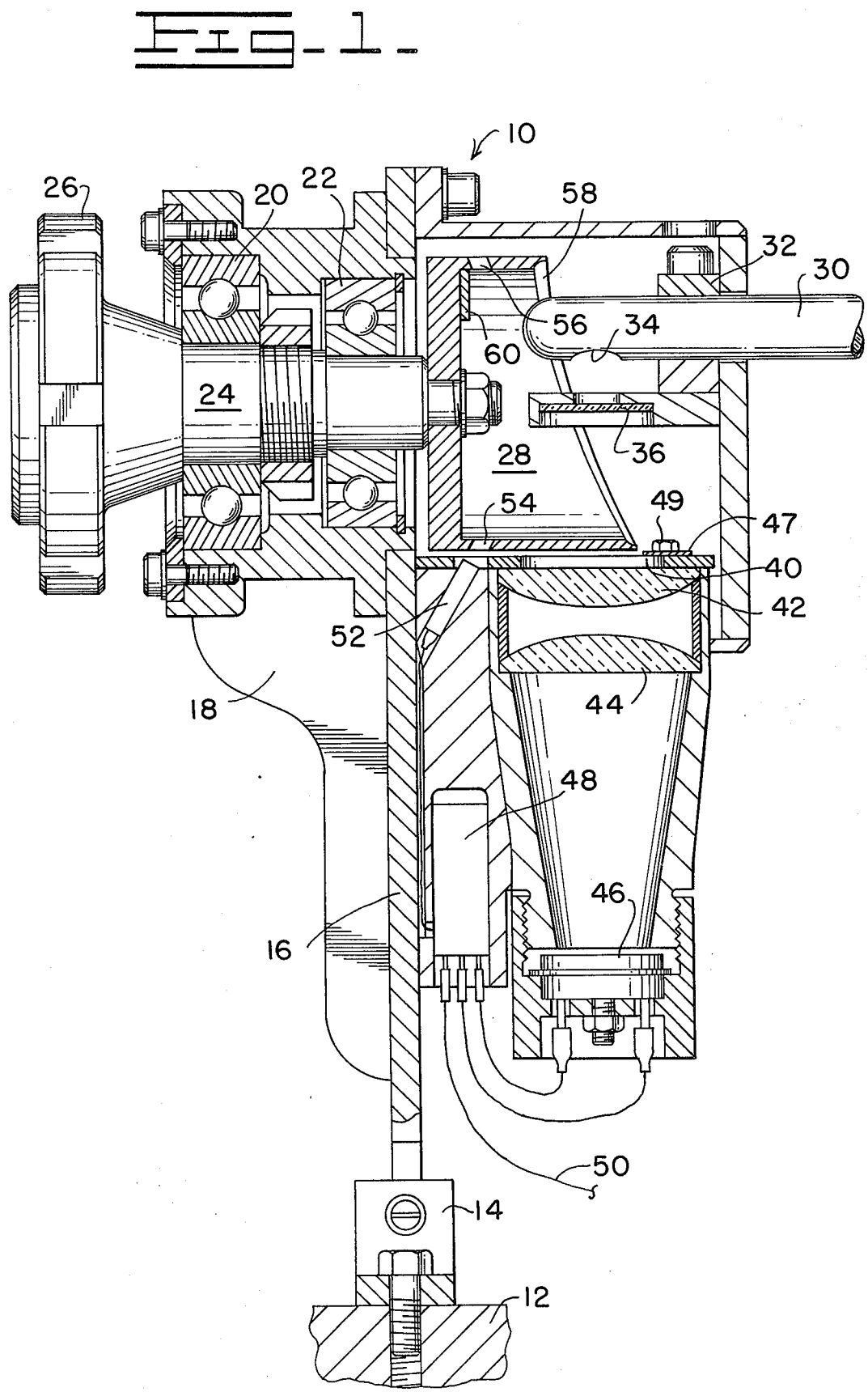
FIG. 1 is a vertical section of the device of this invention.

The volume signal generator of this invention is generally shown at 10 in FIG. 1. It is adapted to be supported on a fixed support 12 by an adjustable mounting bracket 14 which is secured to the supporting plate 16. For rigidity purposes, the support plate 16 is provided with a brace plate 18 which firmly supports the portion of the generator in which the drive shaft bearings 20, 22 are located.

The bearings 20, 22 provide rotatable support for a drive shaft 24 whose left end in FIG. 1 is provided with a mounting flange 26 for attachment to the crankshaft (not shown) of an engine to be tested. On its right hand in FIG. 1, the drive shaft 24 carries a cam member 28 better illustrated in FIG. 2.

Passing over the particular construction of the cam member 28 for the time being, it will be noted that a fiber optic light guide 30 is inserted into the hollow interior of cam member 28 through a mounting bracket 32 attached to the housing of the generator 10. The guide 30 has an opening 34 through which light is directed downwardly in FIG. 1 through a light diffuser 36, an elongated slot 40 (best shown in FIGS. 1 and 3), and focusing lenses 42, 44 onto the surface of the photo diode 46.

A cover plate 47 is mounted for sliding adjustment by bolts 49 slidable in slots 51, as best shown in FIG. 3, to cover a selectively variable portion of slot 40. The plate 47 is preferably adjusted so that a minimum small amount of light will be received by the photodiode 46 even when the cam member 28 is in the position shown in FIGS. 1 and 3. Conversely, the plate 47 limits the maximum amount of light received by the photodiode 46 when the cam 28 is rotated 180° from the position of FIGS. 1 and 3 to a value where it will not overdrive the operational amplifier 48. In this manner, the linearity (or at least the consistency of variation) of the output of amplifier 48 as a function of the axial length of cam member 28 at any point in its rotation is preserved.

The photodiode 46 is connected through appropriate leads to an operational amplifier 48 embedded in the housing of device 10, and the output of the operational amplifier is conveyed over lead 50 to appropriate measuring apparatus (not shown) of the type described in U.S. Pat. No. 3,815,410.

An additional photodiode 52 is located in an angularly disposed aperture in the housing of device 10 so as to cooperate with openings 54, 56 of cam member 28 in the 0° and 180° positions, respectively, of the cam to provide a pulse to the measuring equipment whenever the piston of the engine is in the extreme top or bottom position.

Turning now to FIGS. 2, 3, 4A and 4B, it will be seen that the cam member 28 has a curved cam surface 58 whose shape is such that the length of slot 40 which is not obscured by the cam member 28 at any point of its rotation is exactly proportional to the volume of the combustion chamber at that particular point in the rotation of the engine. This function varies with the stroke-to-rod-length ratio of any particular engine, and the cam member 28 must therefore be matched to the engine being tested in order to obtain the accuracy required of the device. FIGS. 4A and 4B illustrate this relationship by showing that crankshaft $C_a$ in FIG. 4A has a rotate through a greater angle $\alpha$ than the angle $\beta$ of crankshaft $C_b$ in FIG. 4B to drive the piston to the half-way mark of its stroke.

A counterweight 60 is mounted inside the hollow cylinder of cam member 28 to counterbalance the additional mass of the cylinder wall on the side where its axial extent is greater. The shape, location, and amount of weight 60 required is a matter of dynamic balancing in accordance with techniques well known in the art and is therefore not specifically described herein.

However, it will be readily understood that the thus balanced cylinder provides a completely vibration-free way of mechanically varying the amount of light seen by photodiode 46 at even the highest engine speeds.

What is claimed is:

1. A volume signal generator for thermodynamic cycle analyzers including a light path and apparatus for mechanically varying the amount of light passing through said path in proportion to the instantaneous volume of the combustion chamber of an engine under analysis, comprising:
   a. uniformly illuminated, elongated slot means positioned in said light path;
   b. axially rotating cam means including a hollow truncated cylinder positioned adjacent to said slot means so as to obscure a portion of said slot means proportional to the axial height of that portion of the cylinder which is closest to said slot means at any given moment at the cylinder's rotation, the truncated surface of said cylinder being so shaped that the axial length of the cylinder wall at any point is proportional to the volume of the combustion chamber of the engine under analysis when that point is nearest said slot means;
   c. light source means for said light path located inside said hollow cylinder, said cylinder wall having at least one opening formed therein; and
   d. photoelectric means positioned adjacent said cylinder for receiving light impulses through said opening in said cylinder wall at a predetermined point in the rotation of said cylinder, said light source being a single light source illuminating both said slot means and said opening.

* * * * *